July 5, 1955  E. C. JONES  2,712,391
MOBILE LIFT FORK

Filed June 9, 1952  2 Sheets-Sheet 1

INVENTOR.
ERNEST C. JONES.
BY
Marvin B Davis
ATTORNEY

July 5, 1955  E. C. JONES  2,712,391
MOBILE LIFT FORK

Filed June 9, 1952  2 Sheets-Sheet 2

INVENTOR.
ERNEST C. JONES.
BY
Marvin B. Davis
ATTORNEY

United States Patent Office 2,712,391
Patented July 5, 1955

2,712,391

MOBILE LIFT FORK

Ernest C. Jones, Kansas City, Mo.

Application June 9, 1952, Serial No. 292,466

1 Claim. (Cl. 214—674)

This invention relates to an improved machine for lifting, carrying and depositing heavy loads, and is an improved type of the commonly known fork lift truck. The unit comprises the major basic parts of a heavy duty industrial tractor with revisions thereof, equipped with large tractor tires, and having attached thereto, and becoming a part thereof, a hydraulically operated lifting and tilting device to which finger-type forks are attached for picking up heavy loads, carrying, and stacking the loads on the ground or on other levels.

This invention, broadly, is to produce an improved mobile lifting device equipped with especially large tires on the traction wheels that will enable the unit to negotiate muddy or snow covered yards, or cultivated fields.

More specifically an object of the improved invention is to produce an attachment on a powered mobile unit that will move through and over, the sandy soils of citrus groves, unpaved storage areas, to pick up and handle lumber, concrete blocks, concrete pipe and other heavy objects in outlying unpaved yard areas where traction is not suited for ordinary fork trucks heretofore used.

Another object of my invention is to provide an improved mobile lift truck with sufficient underneath clearance to travel over rough ground and pass over obstacles that would ordinarily stop lift trucks heretofore used.

Another object of the present invention is to provide an improved mobile lifting device, equipped with large diameter traction wheels that will climb over small obstructions more readily, due to the reduced tractive rolling friction of the large diameter wheels, thus permitting the driving over scrap or waste material in outlying yards that would become definite obstructions for the ordinary fork lift truck of previous designs.

Another object of my invention is to provide a lifting device using a centrally located hydraulic cylinder between the upright members with an overhanging chain over the center of the cylinder, mounted on a pulley with the end of the chain attached to the load lift carriage and one end attached to the back of the cylinder so that any movement of the cylinder upward will cause the load carriage or load lifting forks to raise twice as fast as the height of the lifting mast extends. The object of this construction is to reach maximum lift of load without extending the overall height, enabling the unit to move under overhanging obstructions readily.

Another object of my present improved design is to give adequate space for the operator, thus adding to his comfort, and the method of doing this is to use a vertical gasoline tank which becomes a "back protector" for the operator.

Another object of my invention is to provide a mobile lifting device that may also be used effectively as a pulling device by the addition of a towing hook attached to a counterweight just behind the steering axle. In picking up a load on the carrying forks, and using the loaded mobile unit to pull drawbar loads, the maximum tractive effort is obtained, since the major weight of the counterweight on the rear of the unit and the weight of the carried load on the front of the unit is imposed upon the driving axle equipped with large pneumatic tires, and thus extremely large loads may be pulled or towed.

A further object of my invention is to produce a mobile unit equipped with a transmission, normally to drive the unit in the direction of the lifting forks, and equipped with a gear type steering mechanism to create an automotive type standard steering condition.

Another object of my invention is to provide a heavy duty mobile machine equipped with hoisting mechanism and laterally adjustable lifting forks for handling various width loads or pallets or skids.

Another object of the present invention is to hinge a lift frame on the differentially geared axle housing of a mobile unit, and provide an hydraulic actuating element connected from the lower portion of the differentially geared axle housing to the lift frame whereby the lift frame may be tilted by the thrust of the hydraulic actuating element.

With these objects in view the invention may be more fully understood from the accompanying drawings, the following specification and the scope of the appended claim.

Figure 1:
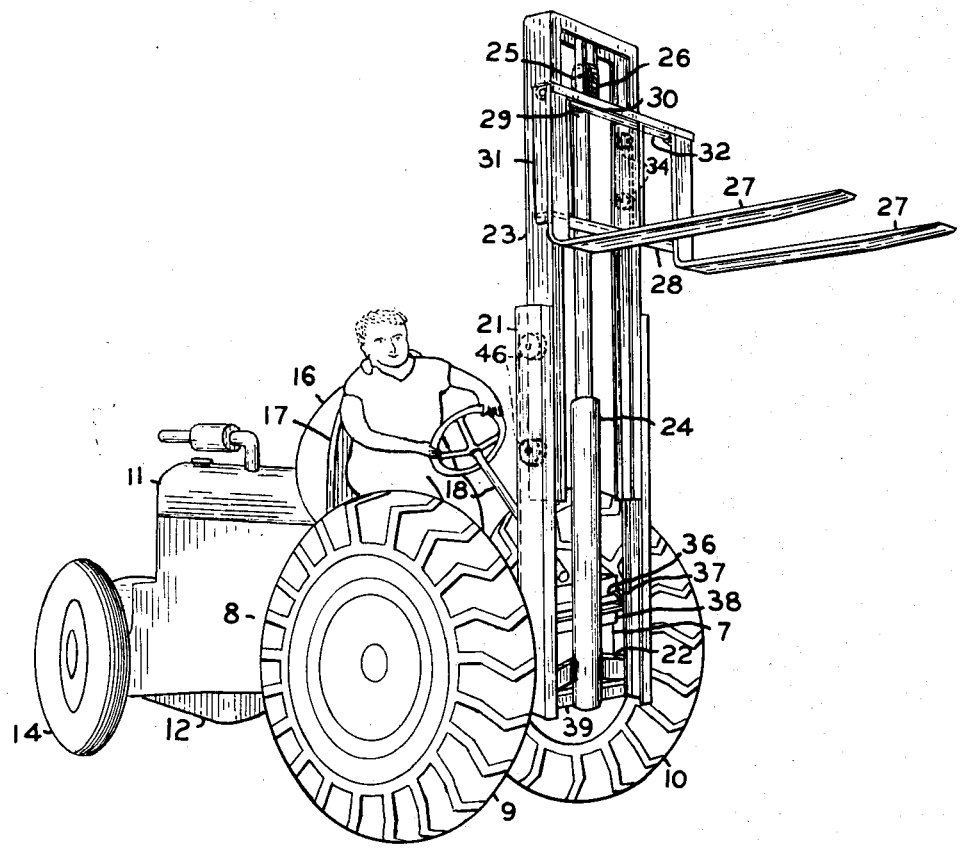
Figure 1 is a perspective view of the mobile lift unit illustrating the lift forks elevated on the lift frame attached to the mobile unit.
Figure 2:
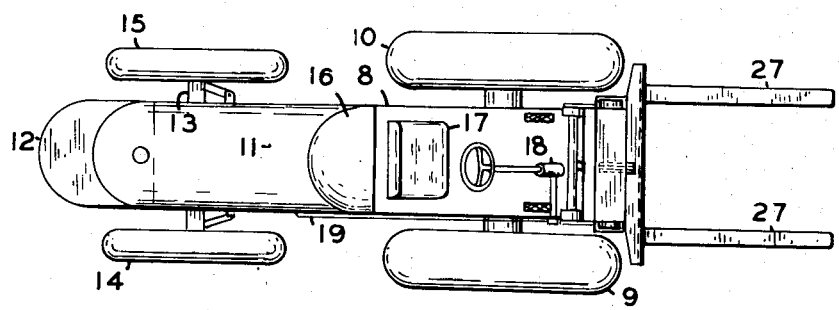
Figure 2 is a plan view of the mobile lift unit on a reduced scale.

The differentially geared axle 6 is mounted in the differential housing 7 and has large tractor type wheels 9 and 10 attached thereto. The differential housing 7 has preferably an integral longitudinal frame 8 extended to the rear of the mobile unit to support the power unit 11 and a heavy counterweight 12.

The frame 8 is supported near the rear thereof by steering axle 13 and rear steering wheels 14 and 15.

A preferably vertical gasoline tank 16 is mounted on the frame 8 in front of the power unit 11 and a seat 17 is mounted in front of the gasoline tank and on the frame 8. Steering mechanism 18 is attached to the frame 8 and is connected by any common and well known steering means 19 to the steering axle 13. A gear shift lever 20 extends upward from the tractor frame 8 and operates a well known transmission not shown but within the frame 8.

A lift frame is preferably composed of two upright channels 21 being spaced apart and connected together by the lower cross frame member 22. An extendable frame 23 slidably mounted between the channels 21 is raised and lowered by a hydraulic lift jack 24 mounted on the lower cross frame member 22 and having a sprocket 25 on the upper end thereof supporting a chain 26 for raising and lowering the forks 27 on their cross frame 28. One end of the chain 26 is anchored at 29 to the hydraulic lift jack 24 and the opposite end is anchored to the lift apron 30.

The cross frame 28 has end plates 31 attached thereto and is provided with a cross shaft 32 to support and fulcrum the forks 27. The plates 33 are provided with mounted rollers 34 to roll in the extendable frame 23 and the frame members 21 are provided with support plates 35 pivoted on cross shaft 36.

The cross shaft 36 is supported on journals 37 attached to the cross frame member 38, and the cross frame member 38 is preferably attached to the front of the differential housing 7.

The lower ends of the lift frame members 21 are provided with a cross frame member 22 to support hydraulic lift member 24, and members 39 supports lugs 40 with pin 41 to support actuating hydraulic tilting member 42. The opposite end 43 of the hydraulic tilting member 42 is pivoted on pin 44 and is supported on lugs 45 attached to the lower portion of the differential housing 7.

Frame 23 is provided with mounted rollers 46 to roll in upright channels 21 for supporting and guiding it when being raised or lowered.

Trucks and tractors have been made for years and the power and steering mechanisms thereof are well known in the prior art. Power lifts of various designs are well known in the art and it is therefore not deemed necessary to detail all the working parts thereof for a complete disclosure of the invention, as the general parts are separately disclosed in the prior art. Therefore it is believed that only the essential features or parts of the invention need be fully detailed for the disclosure thereof. What is believed to be new in this mobile lift unit is outlined in the preamble of this specification and more specifically in providing a differential housing with a lift frame pivoted thereto and actuated by a hydraulic lift or jack attached to the lower portion of the differential housing for tilting the lift frame, the lift frame being mounted between the two large tractor type wheels attached to the differential axle, and a counterweight attached to the frame near the steering axle which is the rear portion of this mobile unit.

With a careful study of this improved mobile unit the power lift is obviously connected to the front of the differential housing with the counterweight to the rear of the rear steering axle thus putting the greater portion of the weight on the heavy duty differential axle with large tractor type wheels and providing a unit that can carry heavy loads and travel over rough roads, yards, orchards and the like transferring merchandise, boxes, tile and any other desired commodity.

Each load may be placed or stacked on other loads by using spacers on top of previously placed loads or by using the well known palletized unit load method of storage.

In the operation the mobile lift truck is driven to an object to be lifted, the forks are lowered to the object by means of the lift cylinder 24, chain 26, and frame 23 sliding between the members 21. The lift jack or cylinder 24 is operated by hydraulic fluid and it lowers the frame 23 when the hydraulic fluid pressure is relieved by the well known method.

The sprocket 25 is fulcrumed between the frame 23 and jack 24 and as the sprocket is moved the chain 26 travels over the top thereof, one end of the chain 26 being attached to the jack 24 at 29 and the opposite end of the chain 26 being attached to the apron frame at 30. The forks travel twice as fast as the frame 23 and when the frame 23 is completely lowered on the jack 24 between the members 21 the forks 27 are on the ground or pavement.

Figure 3:
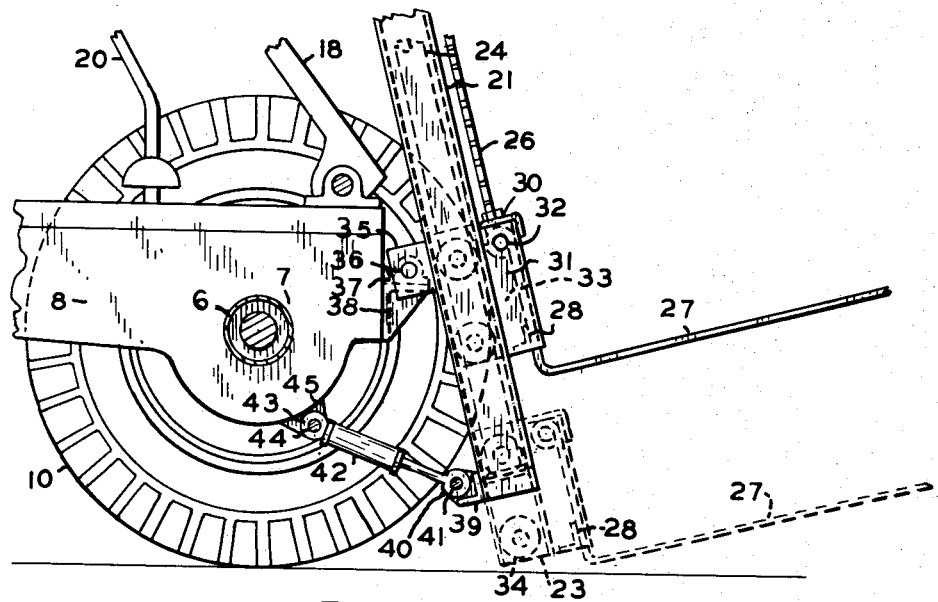
Figure 3 is an enlarged fragmentary view illustrating the differential housing of the mobile unit with a portion of the lift frame attached thereto, the near large tractor type wheel being removed and the far side wheel being shown.
Figures 4, 5:
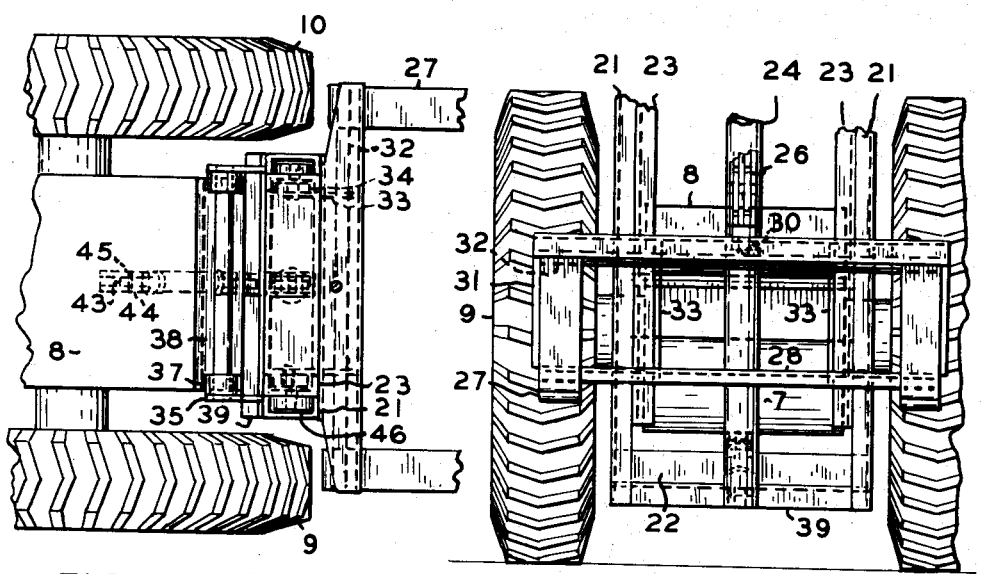
Figure 4 is a fragmentary plan view of Figure 3 except the lift frame is illustrated in a vertical position instead of being tilted as illustrated in Figure 3 and both wheels are shown.
Figure 5 is a fragmentary front elevation of Figure 4.

The forks 27 may be laterally shifted or spaced apart on shaft 32 to correspond with the width of the object to be lifted. The forks may be inclined or declined on the shaft 36 by means of the hydraulic jack 42 moving the lower portion of the frame members 21 by cross member 39 and the load is lifted by hydraulic pressure in the lift cylinder to the desired elevation on the forks 27. The frame members 21 are usually tilted as illustrated in Figure 3 to stabilize the load for traveling from one location to another location. Lift frame 23 operated between vertical members 21 with guide rollers 46 and the apron plates 33 are moved up and down between the vertical members of the frame 23 guided by rollers 34 and the flanges of the frame 23.

What I claim as new and desire to secure by Letters Patent is:

An industrial tractor and lift fork having a conventional industrial tractor with large tractor wheels and tires near the rear end thereof, a pair of smaller conventional steering wheels near the front end thereof, an engine mounted on the front end thereof, an elongated gasoline tank, steering mechanism for control of the steering wheels and a seat, comprising, the elongated gasoline tank being mounted in a vertical position on the tractor between the engine and seat, the seat being mounted on the tractor facing the rear thereof, a steering wheel with steering means being mounted between the seat and rear end of the tractor, a counterweight, said counterweight attached to the front end of the tractor, said counterweight projected substantially beyond the engine and tractor and steering wheels, a hydraulically operated lifting device, a hydraulically operated tilting device, said hydraulically operated lifting and tilting devices being mounted on the rear end of the tractor, said hydraulically operated lifting and tilting devices being supported by the large tractor wheels and tires, and said hydraulically operated lifting and tilting devices being controlled from the tractor whereby the front end of the conventional tractor becomes the rear thereof and the hydraulically operated lifting and tilting devices become the front end thereof.

References Cited in the file of this patent

UNITED STATES PATENTS

| | | |
|---|---|---|
| 2,337,109 | Johnson | Dec. 21, 1943 |
| 2,381,729 | Dunham et al. | Aug. 7, 1945 |
| 2,415,015 | Lull | Jan. 28, 1947 |
| 2,471,152 | Griffin | May 24, 1949 |
| 2,516,473 | McLendon | July 25, 1950 |
| 2,553,531 | Graves | May 15, 1951 |
| 2,554,900 | Davies | May 29, 1951 |
| 2,569,053 | Healy | Sept. 25, 1951 |
| 2,593,796 | Riewerts | Apr. 22, 1952 |
| 2,595,120 | Barnes | Apr. 29, 1952 |
| 2,598,865 | Turner | June 3, 1952 |